Figure 1:
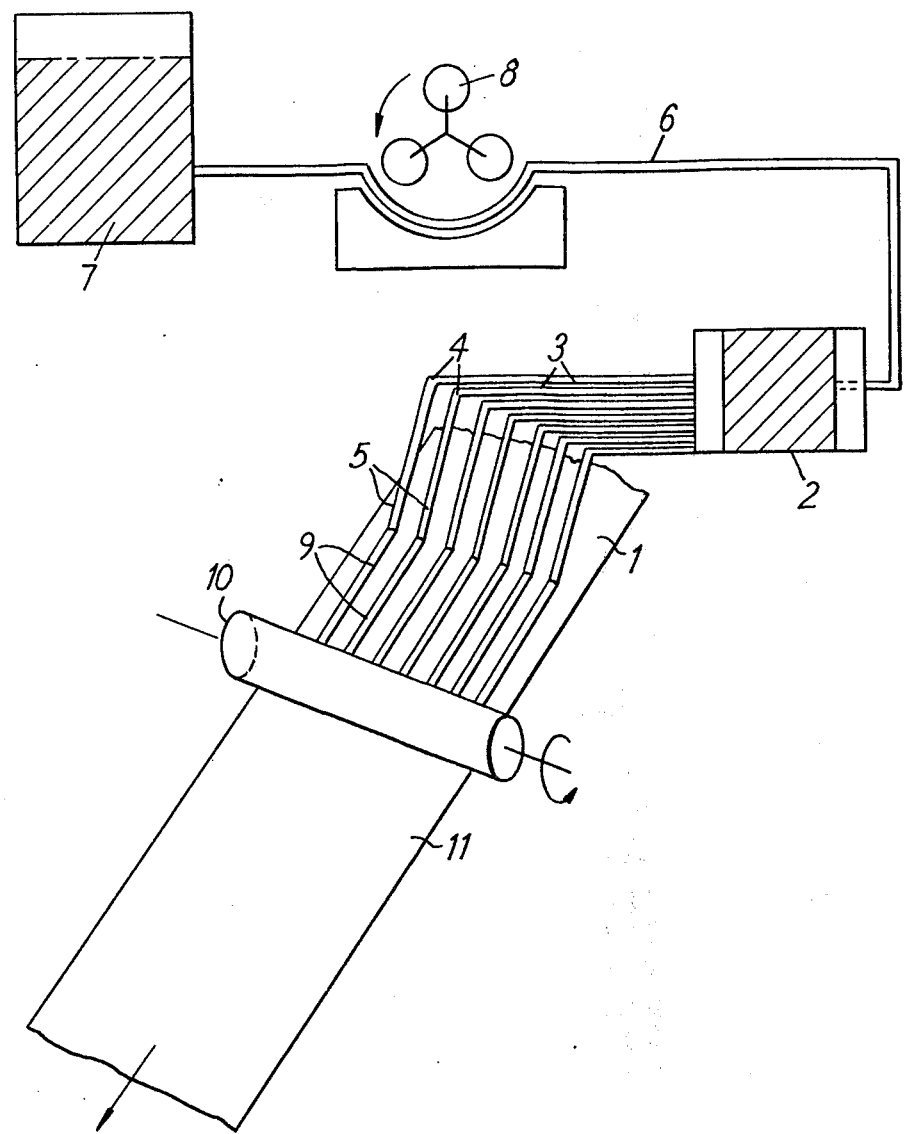

United States Patent [19]

Reade et al.

[11] 4,002,780
[45] Jan. 11, 1977

[54] METHOD AND DEVICE FOR COATING PLASTICS FILM

[75] Inventors: Grahame Melvin Reade, Wheathampstead; Alan Charles Viney, Welwyn Garden City, both of England

[73] Assignee: Imperial Chemical Industries Limited, London, England

[22] Filed: Sept. 16, 1974

[21] Appl. No.: 506,544

Related U.S. Application Data

[63] Continuation-in-part of Ser. No. 235,718, March 17, 1972, abandoned.

[30] Foreign Application Priority Data

Mar. 26, 1971 United Kingdom ............... 7910/71

[52] U.S. Cl. ............................. 427/209; 156/244; 156/500; 427/365; 427/374 D; 427/385 B
[51] Int. Cl.² ......................................... B05D 1/40
[58] Field of Search ............... 117/65.2, 68, 44, 94, 117/64; 156/244, 500; 427/209, 365, 385, 374

[56] References Cited

UNITED STATES PATENTS

| | | | |
|---|---|---|---|
| 2,066,780 | 1/1937 | Holt | 117/44 |
| 3,106,481 | 10/1963 | Sorg | 117/44 |
| 3,397,101 | 8/1968 | Rausing | 156/244 |

*Primary Examiner*—Ronald H. Smith
*Assistant Examiner*—Janyce A. Bell
*Attorney, Agent, or Firm*—Cushman, Darby & Cushman

[57] ABSTRACT

Coating tubular plastics film by depositing on each surface of the lay-flat web a plurality of evenly spaced lines of coating material parallel with the length of the web, and using contra-rotating rollers to spread the deposited lines, causing them to merge into a uniform coating.

10 Claims, 2 Drawing Figures

METHOD AND DEVICE FOR COATING PLASTICS FILM

This invention relates to a method and device for coating tubular plastics films, and this application is a continuation-in-part of our United States Application, Ser. No. 235,718, filed 17 Mar. 1972 and now abandoned.

It is often necessary or desirable to apply a coating or tubular plastics film, to function, for example, as a heat-sealable coating or as a barrier to gases. It is often convenient to apply the coating after the tubular film has been collapsed to a lay-flat form, the coating being applied either simultaneously to the two surfaces of the flattened film web, or separately first to one side and then to the other. It has been found, however, that conventional coating methods, such as those in which the coating is applied in excess to the surface and the coating is spread and excess material removed by a doctor knife or similar device, or in which a continuous coating is applied directly by extrusion, are not satisfactory when used for the coating of flattened tubular film. This is largely because the resilience of the film tends to prevent complete collapse of the tubing at the side folds, and the applied coatings are consequently thinner at and towards the side folds than in the portions at or towards the centre of the tubular film, away from the side folds.

The present invention provides a method by which substantially uniform coatings may be applied to tubular plastics films in the lay-flat form.

In accordance with the invention, a method of coating tubular plastics film in lay-flat form comprises depositing on the external surface of a tubular film web a plurality of lines of a flowable coating material capable of being solidified, the lines being parallel with the length of the tubular film and substantially evenly spaced across the width of the surface thereof, and all being deposited at substantially the same rate, thereafter passing the web in contact with a contra-rotating roller, thereby applying to said external surface a pressure sufficient to spread and merge the deposited lines of coating material to cover said external surface, and causing or allowing the resulting coating to solidify.

The invention further provides a device for coating tubular plastics film in lay-flat form which comprises a plurality of nozzles substantially equally spaced apart through each of which flowable coating material may be extruded at substantially the same rate, means for advancing the tubular film in lay-flat form lengthwise past said nozzles to receive a plurality of lines of the coating material spaced across a surface thereof, and roller means capable of rotating in contact with said surface, in a direction contrary to the direction of advancement of said surface, for applying to said surface a pressure sufficient to spread and merge the deposited lines of coating material upon said surface.

In lay-flat form a tubular film effectively presents an external surface having two sides, and these two sides may be coated simultaneously or separately with the coating material.

The method of the present invention differs from known spreading methods in that exactly the required amount of coating material may be applied directly to the tubular film, and this may be spread evenly upon the external film surfaces. Thus, in attempting to spread a coating material onto an external surface of a tubular thermoplastic film web in collapsed or lay-flat form by means of a conventional stationary doctor blade in the form of either a roller or a thin flexible blade of metal or plastic inclined at an acute angle to, and with the exposed edge of the blade facing in, the direction of travel of the web, we have observed that not only is the resultant coating of non-uniform thickness across the width of the web, but also a considerable proportion of the applied coating material accumulates on the web on the upstream side of the doctor blade, and eventually runs to waste over the edge of the web. In contrast, by employing, in accordance with the present invention, a spreading roller rotating in a direction contrary to that in which the web is advanced, uniformly coated webs are obtained without wastage of coating material.

Wastage of coating material when a spreading member such as a stationary doctor blade or roller, or even a spreading roller rotating in the same direction as the direction of advancement of the web, is employed, arises, we believe, by virtue of the inherent tension in the tubular web substrate which thereby presents a relatively taut surface to the spreading member so that much of the applied coating material is unable to pass between the member and substrate and instead is squeezed out to form a bank or wedge on the substrate on the upstream side of the member. However, when a contra-rotating roller is employed we believe that the roller initially tends to blur and merge the applied lines of coating material, and that this material is then transferred around the periphery of the roller and deposited on the substrate on the downstream side of the roller where the final spreading of the applied material to form a uniform coating is effected by virtue of the surface tension forces existing within the coating material. Therefore, at least a proportion of the coating material does not pass between the substrate and spreading roller but instead of being swept to waste, as happens with a stationary member or co-rotating roller, is transferred around the periphery of the contra-rotating roller and deposited on the downstream side of the roller to form a uniform coating on the substrate.

There is a further advantage in the use of a contra-rotating spreading roller according to the invention. The tension of the film to be coated may vary, owing to shrinkability of the film, and a doctor blade cannot easily be adjusted to compensate for this so as to maintain uniform coating. In the process of the invention, the effect of variable tension in the substrate film is easily compensated by altering the speed of contra-rotation of the spreading rollers, by increasing it if tension increases and vice versa.

One form of the method and device of the invention will now be more particularly described by way of example with reference to FIG. 1 of the accompanying drawings, which is a diagrammatic perspective view of the device in operation.

In FIG. 1: 1 is a web of tubular film in lay-flat form, continuously advanced by a pair of driven nip-rolls (not shown) downstream of the device; 2 is a pressure reservoir having a plurality of outlets to each of which is connected a small-diameter tube, 3, these tubes being passed through a spacing device (not shown) by which they are equally spaced apart at predetermined intervals as at 4, and thence having their free ends, 5, trailing upon the tubular film web, 1, at equal intervals across its surface. The tubes are, of course, of equal diameter and their spacing is adjusted, in relation to the width of the web, so that the tubes, including those at the sides, will each deposit coating material for an equal width of the web. The pressure reservoir 2 is supplied through a flexible tube, 6, with coating material pumped at constant rate, from a supply reservoir, 7, by a peristaltic pump, 8. The speed of the pump may be adjusted to give a desired rate of deposition of the coating material on the tubular film web.

The coating material is deposited on the web as a plurality of parallel lines, 9, and the web, with these lines of coating material still in a softened state, passes in contact with a contra-rotating roller, 10, which spreads the deposited lines of coating material upon the surfaces of the web, and causes them to merge. The coated web, 11, may then be dried if necessary.

FIG. 1 of the drawings shows the coating device for only one side of the tubular film. However, both sides of the web may be coated simultaneously by a simple modification of the device shown, a separate pressure reservoir with coating tubes being provided for the second side of the web, the ends of the coating tubes being directed upwards against the web, and the second pressure reservoir being filled from the same supply reservoir through a second flexible tube, corresponding to tubing 6, passing through the same peristaltic pump, 8. The web, coated on both sides, will finally pass in contact with at least two contra-rotating rollers, at least one on each side of the film (one being the roller 10) to spread and merge the lines of coating material on both sides simultaneously. The web preferably passes round each roller with a wrap angle of about 45°.

The tube (or tubes) 6 may be made of rubber or other elastically deformable material, preferably of silicone rubber because of its good recovery characteristics. The tubes 5 are preferably made of a non-stick material, polytetrafluoroethylene being especially suitable.

Figure 2:
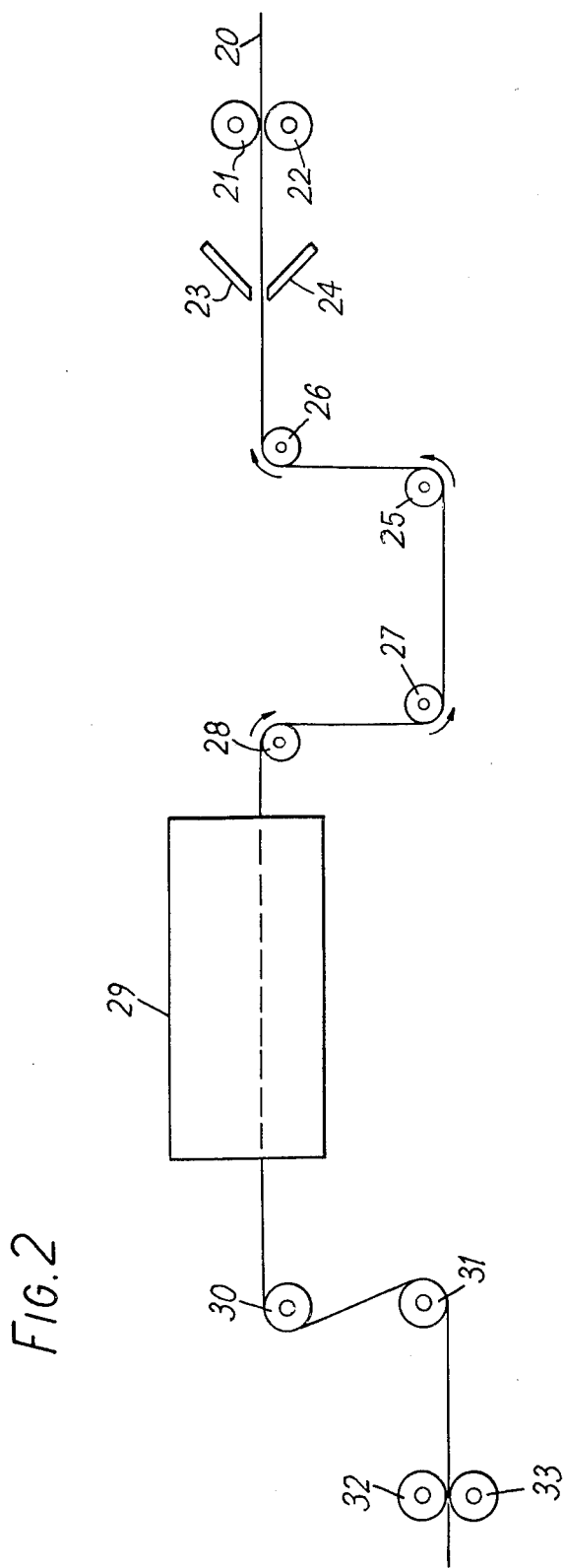

A preferred embodiment of the invention for simultaneously coating both external surfaces of a collapsed tubular web is illustrated in the schematic side elevation depicted in FIG. 2 of the accompanying drawings. In FIG. 2 a collapsed tubular web 20 is advanced from right to left by a pair of driven nip rollers 21, 22 between opposed sets of applicator tubes 23, 24 trailing respectively against the upper and lower surfaces of the collapsed tubular web and arranged, as described in relation to FIG. 1, to deposit equally spaced lines of coating material onto the respective surfaces of the web. The web then passes around a first pair of spreading rollers 25, 26 bearing respectively against the upper and lower surfaces of the web and rotating, as shown by the arrows, counter to the direction of advancement of the film to spread and merge the applied lines of coating material. Spreading of the coated material is completed by a second pair of contra-rotating rollers 27, 28, and the coated web is passed through a hot air oven 29 to dry the applied coating, around a pair of co-rotating chilled rollers 30, 31 to cool the web before further handling, through a second pair of nip rollers 32, 33, and thence to further treatment stations or to a wind-up station (not shown). Use of the second pair of contra-rotating rollers results in a considerable further improvement in the quality of the coating.

If desired, the aforementioned coating sequence may be repeated a plurality of times to increase the thickness of the applied coating to any desired level.

The technique of the present invention is suitable for coating lay-flat web over a wide range of web speeds, the controlling factors being inter alia, the efficiency of the oven system for drying the coating, and the ability to maintain the web properly aligned with respect to the applicator tubes. Conveniently, the linear speed of the web is within a range of from 50 to 250 feet per minute (about 15 to 75 m/min), but speeds outside this range are perfectly feasible.

When a single contra-rotating spreading roller is applied to a surface of the web, as depicted in FIG. 1 of the accompanying drawings, the peripheral speed of the contra-rotating roller is conveniently maintained at a value approximately one fifth that of the web speed, but the roller speed may be varied over a wide range in order to spread the applied coating to the required thickness and uniformity.

When a pair of contra-rotating spreading rollers are applied in succession to one surface of a web, for example rollers 25 and 27 of FIG. 2, the peripheral speed of the second roller is suitably maintained at a value higher than that of the spreading roller which first contacts that surface. For example, when depositing a vinylidene chloride-acrylonitrile copolymer latex to form a coat having a thickness when dry of between about 2.5 and 3.8 $\mu$m onto the external surface of a lay-flat tubular film travelling at a speed within a range of from 50 to 150 feet per minute (about 15 to 45 m/min), using apparatus of the kind described in FIG. 2, the first pair of spreading rollers 25, 26 was conveniently maintained at a peripheral speed of between 18 and 27 feet per minute (about 5.5 to 8 m/min), while the second pair of spreading rollers 27, 28, was suitably maintained at a peripheral speed of between 47 and 84 feet per minute (about 14 to 26 m/min), both sets of rollers rotating in a direction contrary to the direction of movement of the collapsed web.

The method and device of the invention may be used for providing upon the surface of the tubular film a coating of any flowable material that may be thereafter solidified. It is particularly useful for applying coatings from solutions, emulsions or dispersions, since these may be applied at ambient temperatures, and the coating solidified by drying. For example, the method may be used for applying, as latices, vinylidene chloride copolymers of the type used for heat-sealable, gas-impervious coatings. The method may be used for melt coating, provided that the coating material is maintained at a temperature above its melting point until the lines of coating material have been spread and caused to coalesce upon the surface of the tubular film. Thus, the device illustrated could be adapted for melt-coating by replacing the pressure reservoir, 2, by a constant volume pump and by maintaining the tubes 5 at an elevated temperature appropriate to the coating material being used.

When the coating is deposited from a solution, emulsion or dispersion, drying is preferably assisted by heating of the film, for example by warm currents of air or by passing it through an oven or past radiant heaters. When it is deposited as a melt, the coating may be allowed to cool, or cooling may be assisted, for example by passing the tubular film against or between chilled rollers.

The coating method may be used for coating tubular plastics films before or after they are oriented by stretching, if this is required. If the film is to be oriented, the coating is preferably applied first, since orientation generally produces a marked improvement in adhesion of the coating to the film.

Plastics films that may be coated by the method of the present invention include those formed from, for example, linear polyesters such as polyethylene terephthalate, polyolefines such as polyethylene, polypropylene and copolymers of ethylene or propylene with other olefines or other comonomers, or polycarbonate resins.

Our invention is illustrated by reference to the following Examples, in which parts given are by weight.

EXAMPLE 1

The coating method previously described with reference to FIG. 1 of the drawings was used to coat both sides of a web of tubular film of polyethylene terephthalate. A latex of vinylidene chloride-acrylonitrile copolymer (93:7) containing 45% solids, was fed from the supply reservoir (7), through two supply tubes (6) of silicone rubber, each of 1/16 inch (1.587 mm) internal diameter and each passing through the peristaltic pump (8), to two pressure reservoirs (2). From the outlet side of each pressure reservoir, 7 tubes (5), each made of polytetrafluoroethylene and each of 0.022 inch (0.550 mm) internal diameter, were trailed against opposite sides of the travelling tubular film web. The latex was deposited from the tubes in 7 parallel lines, ¼ inch (6.35 mm) apart and each 1/16 inch (1.587 mm) wide, on each side of the web, the lay-flat width of the tubular film being 2.72 inches (69 mm). The tubular film, moving at 100 ft/min (30.5 m/min) was then passed in zig-zag manner round two spaced, 1 inch (2.54 cm) diameter rollers, contra-rotating with respect to the direction of travel of the film at 1/5 of the film speed, the wrap angle being 45° in each case. The parallel lines of coating latex were merged by these rollers into a uniform coating on each side of the web. The speed of the peristaltic pump was adjusted to give a coating thickness (wet) of 0.0003 inch (7.6 μm). Finally, the coating was dried at a temperature of about 100° C. A dry coating of highly uniform thickness was obtained on each side of the web.

EXAMPLE 2

Using the coating technique previously described with reference to FIG. 2 of the drawings a collapsed tubular web of polyethylene terephthalate having a layflat width of 2.72 inches (69 mm) was coated with a 45% solids latex of a copolymer of vinylidene chloride and acrylonitrile (92:8 by weight) containing 1% by weight of KPS wax, the latex being applied from two sets of applicator tubes 23, 24, each set comprising seven polytetrafluoroethylene tubes of internal diameter 0.022 inch (0.550 mm) equally spaced apart across the width of the web at 0.25 inch (6.35 mm) intervals. Latex was supplied to the applicator tubes at a rate such that the coating applied to each external surface of the web had a thickness, when dry, of approximately 13 gauge (3.3 μm). The applied latex was smoothed by means of two pairs of contra-rotating spreading rollers, each roller being chromium plated and of 1 inch (25.4 mm) diameter. The coated web was then dried by passage through an air oven maintained at a temperature of 135° C.

The linear speed of the web was maintained at 50 feet per minute (15.2 m/min) and the speeds of the pairs of contra-rotating spreading rollers 25, 26 and 27, 28, adjusted to determine the minimum and maximum acceptable roller speeds, the minimum roller speed being defined as that at which the coating latex began to form a noticeably thick edge on the web, while the maximum acceptable roller speed was defined as that at which the applied coating latex became streaky indicating that the coating latex was not being uniformly spread over the web surface.

It was observed that to achieve acceptable spreading of the coating latex the peripheral speed of the first pair of contra-rotating spreading rollers 25, 26 could be varied within a range of from 13 to 27 feet per minute (4.0 to 8.2 m/min), while that of the second pair of spreading rollers 27, 28 could be varied within a range of from 26 to 84 feet per minute (7.9 to 25.6 m/min).

EXAMPLE 3

The procedure of Example 2 was repeated, the dry coat thickness being approximately 13 gauge (3.3 μm), but in this Example the linear speed of the web was raised to 100 feet per minute (30.5 m/min).

Acceptable coating behaviour was observed when the peripheral speed of the first pair of contra-rotating spreading rollers was within a range of from 15.5 to 29.5 feet per minute (4.7 to 9.0 m/min), and that of the second pair of spreading rollers was within a range of from 47 to 90.5 feet per minute (14.3 to 27.6 m/min).

EXAMPLE 4

The procedure of Example 2 was repeated, the dry coat thickness being approximately 13 gauge (3.3 μm), but in this Example the linear speed of the web was raised to 150 feet per minute (45.7 m/min).

Acceptable coating behaviour was observed when the peripheral speed of the first pair of contra-rotating spreading rollers was within a range of from 18 to 27 feet per minute (5.5 to 8.2 m/min), and that of the second pair of contra-rotating spreading rollers was within a range of from 45 to 91 feet per minute (13.7 to 27.8 m/min).

EXAMPLE 5

By the procedure of Example 2 a 45% solids latex of a vinylidene chloride-acrylonitrile copolymer (92:8 by weight) containing 2% by weight of KPS wax was applied at a rate of approximately 25 milliliters per minute to each of the upper and lower surfaces of a lay-flat polyester tube travelling at a linear speed of 100 feet per minute (30.5 m/min). The applied coating was spread by two consecutive pairs of chromium plated rollers of one inch diameter as illustrated in FIG. 2 of the drawings, and dried in an air oven maintained at a temperature of 135° C.

The first pair of spreading rollers 25, 26 were rotated contrary to the direction of movement of the web at a peripheral speed of 21 feet per minute (6.4 m/min) and the second set 27, 28 were contra-rotated at a peripheral speed of 59 feet per minute (18.0 m/min).

It was observed that the latex coating was spread uniformly across the width of the web and not latex dripped from the rollers at any stage during the experiment. The thickness of the dried coating on the upper surface of the web was found to be 17.5 gauge (4.38 μm) and that on the lower surface to be 14.5 gauge (3.68 μm).

EXAMPLE 6

This is a comparative Example, not according to the invention.

The procedure of Example 5 was repeated in every respect except that the direction of rotation of the spreading rollers was reversed so that the rollers rotated in the same direction as the direction of movement of the tubular web.

The first set of spreading rollers co-rotated at a peripheral speed of 21 feet per minute (6.4 m/min), and the second set co-rotated at a peripheral speed of 59 feet per minute (18.0 m/min).

Spreading of the latex coating by the first set of rollers was observed to be non-uniform, the latex accumulating on the upstream side of the rollers and then running to waste over the edge of the web. Latex which remained on the web was spread by the second pair of rollers but again the thickness of the spread coating was not uniform, being markedly thicker at the edge than in the centre portion of the web. The average thickness of the dried coating on the upper surface of the web was 12 gauge (3.05 μm) and that on the lower surface was 11 gauge (2.79 μm).

EXAMPLE 7

This is a comparative Example, not according to the invention.

The procedure of Example 5 was repeated in every respect except that both sets of spreading rollers remained stationary throughout the experiment.

Spreading of the latex coating in this Example was observed to be considerably worse than that in Example 6, the stationary rollers acting as a barrier to the applied coating latex and causing a considerable proportion of the applied latex to accumulate upstream of the rollers before running to waste over the edge of the web. Latex which succeeded in passing the stationary rollers was not uniformly spread, the coating being thicker at the edge than in the centre portion of the web. The average thickness of the dried coating on the upper surface of the web was 9 gauge (2.38 μm), and that on the lower surface was 9.5 gauge (2.42 μm).

EXAMPLE 8

This is a comparative Example, not according to the invention.

The procedure of Example 5 was repeated except that the coating latex was applied only to the upper surface of the web, and that the spreading rollers were replaced by a single flexible brass doctor blade of width 6 inches (152 mm), depth 3.5 inches (89 mm), and thickness 0.005 inches (0.127 mm). The flexible blade was arranged at an acute angle to, and with its exposed edge facing in, the direction of travel of the web, the latter being held under tension between nip rollers 21, 22 and 32, 33 before and after drying oven 29 (FIG. 2).

The force with which the blade was pressed against the web was adjusted to achieve the optimum level of uniformity of the coating without building up an excess of latex at the blade. However, the blade was unable to cope with the natural "ripples" in the web, and the resultant coating was extremely non-uniform in thickness.

The average thickness of the applied coating, when dry, was 21 gauge (5.3 μm).

We claim:

1. A method of coating tubular plastics film in lay-flat form comprising depositing on each side of the external surface of the tubular film a plurality of lines of a flowable material capable of forming a coating, passing each side of the external surface with the deposited material over a roller rotating contrary to the direction of travel of the film, and applying sufficient pressure between the roller and the said side of the film surface to spread and merge the material to cover the said side, and subsequently causing or allowing the resulting coating to form a solid coating.

2. A method according to claim 1 wherein the lines of coating material are spread and merged by contacting each side of the external surface with at least two rollers in succession each of which rotates contrary to the direction of travel of the film.

3. A method according to claim 2 wherein the peripheral speed of at least the second of said contra-rotating rollers to contact each side exceeds that of the first of said contra-rotating rollers to contact the said side.

4. A method as in claim 1 wherein the lines of coating material are extruded from a plurality of tubes having free ends trailing against the surface of the film.

5. A method as in claim 1 wherein the coating material is selected from the group consisting of solutions, emulsions and dispersions.

6. A method as in claim 5 wherein the coated film is heated to dry the coating.

7. A method as in claim 1 wherein the coating material is applied as a melt.

8. A method as in claim 7 wherein the melt coated film is cooled by passing the coated film in contact with at least one chilled roller.

9. A method as in claim 1 including orienting the tubular film and wherein the coating is applied before or after orientation.

10. A method of applying a coating material uniformly to a continuous tubular plastics film in lay-flat form comprising: feeding the continuous tubular plastics film in its lengthwise direction; extruding on to both external surfaces of the moving film at a single pass a plurality of lines of a material capable of forming a coating, the lines being parallel with the length of the film and substantially evenly spaced across the width of the surface thereof, and all being deposited at substantially the same rate; thereafter passing each surface of the moving film and the lines of coating material into contact with the surface of a roller which is disposed transversely of the film and which is rotating in a direction opposite to the direction of movement of the film thereby applying to said external surface of the film pressure sufficient to spread and merge the deposited lines of soft coating material into a coating which is of uniform thickness and which covers said external surface; and causing or allowing the soformed coating to form a solid coating.

* * * * *